United States Patent [19]

Kollie et al.

[11] Patent Number: 5,406,831
[45] Date of Patent: Apr. 18, 1995

[54] INSTRUMENT FOR MEASURMENT OF VACUUM IN SEALED THIN WALL PACKETS

[75] Inventors: Thomas G. Kollie, Oak Ridge; Louis H. Thacker, Knoxville, both of Tenn.; H. Alan Fine, Lexington, Ky.

[73] Assignee: Martin Marietta Energy Systems, Inc., Oak Ridge, Tenn.

[21] Appl. No.: 130,261

[22] Filed: Oct. 1, 1993

Related U.S. Application Data

[63] Continuation-in-part of Ser. No. 826,799, Jan. 27, 1992, Pat. No. 5,249,454.

[51] Int. Cl.⁶ .................... G01M 3/02; G01M 3/38
[52] U.S. Cl. .................................. 73/49.3; 73/52; 356/373
[58] Field of Search ........................ 73/49.3, 52, 37; 250/227.28; 356/373

[56] References Cited

U.S. PATENT DOCUMENTS

| 2,512,134 | 6/1950 | Baule | 73/37 |
|---|---|---|---|
| 3,117,441 | 1/1964 | Zimmerman | 73/37 |
| 3,667,281 | 6/1972 | Pfeifer | 73/37 |
| 3,940,608 | 2/1976 | Kissinger | 250/227 |
| 3,940,608 | 2/1976 | Kissinger et al. | 250/227 |
| 4,478,070 | 10/1984 | Clifford et al. | 73/49.3 |
| 4,656,866 | 4/1987 | Aarts | 73/49.3 |
| 4,709,578 | 12/1987 | Iwasaki et al. | 73/49.3 |
| 4,715,215 | 12/1987 | Perhach et al. | 73/49.3 |
| 4,747,299 | 5/1988 | Fox et al. | 73/49.3 |
| 4,771,630 | 9/1988 | Croce et al. | 73/49.3 |
| 4,907,443 | 3/1990 | Pailler | 73/52 |
| 5,249,454 | 10/1993 | Kollie et al. | 73/49.3 |

FOREIGN PATENT DOCUMENTS

59-60014  10/1985  Japan .

Primary Examiner—Hezron E. Williams
Assistant Examiner—Michael J. Brock
Attorney, Agent, or Firm—Pitts & Brittian

[57] ABSTRACT

An instrument for the measurement of vacuum within sealed packets 12, the packets 12 having a wall 14 that it can be deformed by the application of an external dynamic vacuum to an area thereof. The instrument has a detector head 18 for placement against the deformable wall 14 of the packet to apply the vacuum in a controlled manner to accomplish a limited deformation or lift of the wall 14, with this deformation or lift monitored by the application of light as via a bifurcated light pipe 20. Retro-reflected light through the light pipe is monitored with a photo detector 26. A change (e.g., a decrease) of retro-reflected light signals the wall movement such that the value of the dynamic vacuum applied through the head be to achieve this initiation of movement is equal to the vacuum within the packet 12. In a preferred embodiment a vacuum plate 44 is placed beneath the packet 12 to ensure that no deformation occurs on the reverse surface 16 of the packet. A vacuum can be applied to a recess in this vacuum plate, the value of which can be used to calibrate the vacuum transducer in the detector head.

9 Claims, 3 Drawing Sheets

INSTRUMENT FOR MEASURMENT OF VACUUM IN SEALED THIN WALL PACKETS

This invention was made with Government support under Contract No. DE-AC05-84OR21400 awarded by the U.S. Department of Energy. The research was funded through the Building Thermal Envelope Systems and Materials Program (BTESM) from the Office of Buildings Energy Research, Building Systems and Materials Division. The Government has certain rights in this invention.

This application is a continuation-in-part patent application based upon parent application Ser. No. 07/826,799 filed Jan. 27, 1992, now U.S. Pat. No. 5,249,454 issued Oct. 5, 1993.

TECHNICAL FIELD

This invention relates to the determination of vacuum in enclosed containers, and more particularly to an instrument for the measurement of vacuum in sealed, thin-walled packets such as plastic film packets.

BACKGROUND ART

There are a large number of products in industry that are encased in plastic film packets. Many of these products require the presence of a vacuum within the packets, such as for the preservation of food and drug products. Another important sealed product is the super-insulator packets of precipitated silicon dioxide powder and similar powders having low thermal conductivity in vacuum. In these and other applications it is desirable to exclude air and other gases to prevent various types of reactions with the material that is enclosed and to prevent undesirable effects on the physical properties of the packets, e.g. thermal conductivity.

There has been a need, therefore, to measure the value of the internal vacuum after the sealing operation, as well as after storage for any length of time. This measurement needs to be non-intrusive, i.e., there should be no potential intrusion into the packet.

One instrument that has been utilized in the prior art involves immersing the entire sealed packet into a vacuum system, and then "interrogating" the packet optically for movement of the film envelope when the chamber vacuum falls below the packet vacuum. This type of equipment is expensive and, more important, is time consuming when each packet must be individually tested in the vacuum chamber. In particular, this type of equipment is not readily amenable to inclusion in production line testing.

References that may be pertinent to the evaluation of this invention are U.S. Pat. No. 4,478,070 issued to E. W. Clifford, et al, on Oct. 23, 1984; U.S. Pat. No. 4,715,215 issued to J. M. Perhach, et al, on Dec. 29, 1987; and U.S. Pat. No. 4,747,299 issued to J. M. Fox, et al, on May 31, 1988. All of these devices require extensive (and thus expensive) equipment, and since each packet must be evaluated, the testing is time consuming with these devices of the prior art.

Other references that may be pertinent to an evaluation of the present invention are U.S. Pat. No. 2,512,134, issued to G. H. J. Baule on Jun. 20, 1950; U.S. Pat. No. 3,117,441 issued to E. Zimmerman on Jan. 14, 1964; U.S. Pat. No. 3,667,281 issued to C. F. Pfeifer on Jun. 6, 1972; U.S. Pat. No. 3,940,608 issued to C. D. Kissinger on Feb. 24, 1976; U.S. Pat. No. 4,656,866 issued to M. L. C. Aarts on Apr. 14, 1987; U.S. Pat. No. 4,771,630 issued to C. P. Croce, et al, on Sep. 20, 1988; U.S. Pat. No. 4,709,578 issued to T. Iwasake, et al, on Dec. 1, 1987; and U.S. Pat. No. 4,907,443 issued to A. Pailler on Mar. 13, 1990. A further reference is Japanese Patent Application SHO 60[1985]-202341.

Accordingly, it is an object of the present invention to provide a simple instrument that quickly measures the vacuum within sealed thin-walled packets.

It is another object of the present invention to provide a simple instrument that rapidly measures the vacuum within sealed plastic film packets.

Another object of the present invention is to provide an instrument wherein an external vacuum is applied to a localized area on the exterior of sealed plastic film packets, with means to determine when the film lifts from the content of the packet under the influence of that vacuum applied in the localized area.

Still another object of the present invention is to provide an instrument wherein an external vacuum is applied to a localized area on one exterior surface of sealed plastic film packets, with the opposite exterior surface of the packet being maintained undisturbed by that applied vacuum, with means to determine when the film lifts from the content of the packet under the influence of that vacuum applied in the localized area.

It is also an object of the present invention to provide a hand-held instrument, or one that can be used on a production line, to measure the vacuum within sealed plastic film packets.

A further object of the present invention is to provide a device for the measurement of internal vacuum values with sufficient accuracy (i.e., sensitivity) for detecting packaging motion of as little as 0.1 mil (0.00254 mm).

These and other objects of the present invention will become apparent upon a consideration of the following detailed description when taken together with the drawings referenced hereinafter.

SUMMARY OF THE INVENTION

In accordance with the present invention there is provided a device for the rapid measurement of vacuum within a thin-walled packet such as a sealed plastic film packet. The device utilizes a probe having a vacuum head connected to a vacuum source, and a light-handling means in the form of a bifurcated light pipe (retro-reflective) to direct light upon a surface of the packet subject to the application of vacuum by the head, and to receive reflected light from that surface. In the preferred embodiment, this bifurcated light handling means is a fiber optic light pipe. The amount of reflected light accepted by the fiber optic unit is related to the spacing relationship between the distal end of the fiber optic light pipe and the packet surface and to any deflection of the packet surface by the vacuum. A photo detector receives any reflected light, and the instrument provides a signal when this detected reflected light changes due to packet cover movement by the applied vacuum. The vacuum value within the head is monitored with a vacuum sensor mounted within the head so as to correlate vacuum versus movement. The actual in-packet vacuum value is identical to the applied vacuum value, as measured by the vacuum sensor, at the instant the packet surface lifts. In one embodiment, a vacuum can be applied to the exterior of the packet on an opposite surface to prevent false readings due to deformation of the body of the packet.

BEST MODE FOR CARRYING OUT THE INVENTION

Figure 1:
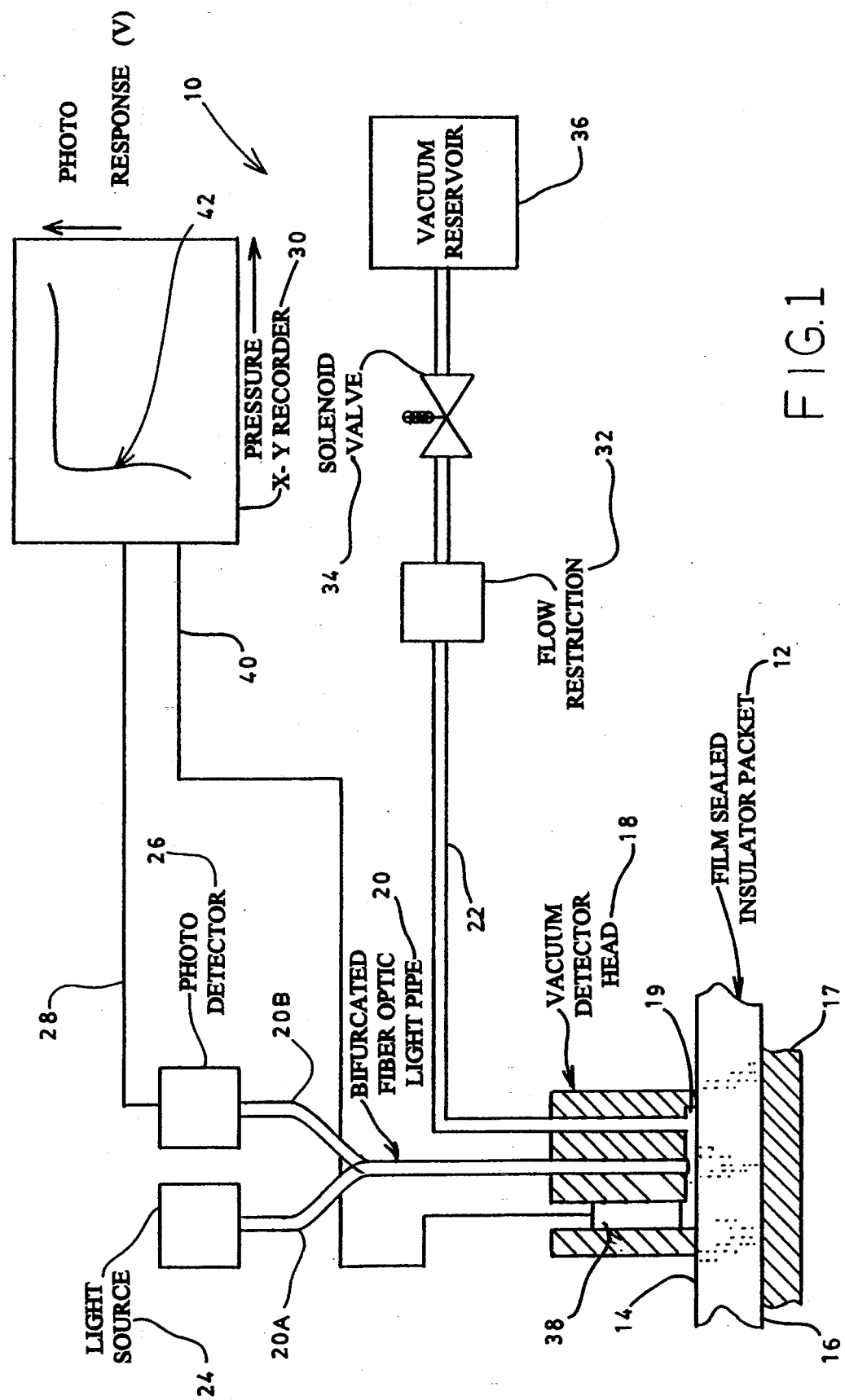
FIG. 1 is a schematic drawing of one embodiment of the present invention as used for the measurement of vacuum within sealed plastic film packets.

One embodiment of the present invention is schematically shown at be in FIG. 1 as applied to the measurement of vacuum within a sealed packet 12. This packet typically has top face 14 and opposite bottom face 16, as shown. During testing, the packet 12 can be placed upon a support 17. Although the top and bottom faces 14, 16 are shown as being flat, the present invention can be adapted to surfaces of other contours. A vacuum detector head 18, defining an interior volume 19, is applied to the packet top face 14 by any means, as by hand or by mechanism, so as to be in intimate contact therewith. This interior volume 19 of the detector head 18 is the distal terminus for a bifurcated fiber optic light pipe 20 (in the preferred embodiment) and for a vacuum line 22, as shown.

The light pipe 20 divides into a portion 20A that leads to a light source 24 at one proximal end whereby light can be directed against the top face 14 of the packet. The second portion 20B leads to a photo detector 26 at the other proximal end whereby an electrical signal will appear on lead 28 due to light retro-reflected from the top face 14. The amount of this retro-reflected light will change when the top face is lifted even slightly toward the distal end of the fiber optic light pipe from its normal position. This signal related to lifting of top face 14 is applied as one input to data processing equipment 30, such as an X-Y recorder depicted in this FIG. 1.

The vacuum line 22 is typically connected to a flow restrictor 32 to limit the air flow so as to provide an appropriate rate of pressure change at the face 14 of the packet 12. Vacuum is applied to this restrictor 32 via a valve 34 (typically a solenoid valve) from a vacuum source 36 such as a vacuum reservoir, vacuum pump, etc. A transducer 38 is positioned within the detector head 18 for measuring the actual vacuum existing within the interior volume 19 of the detector head 18 immediately adjacent the face 14 so that there is no loss of accuracy due to pressure drop along any vacuum line in this fast dynamic system, with an output signal proportional to that value being a second input to the measuring device 30 on lead 40.

It will be recognized by persons skilled in the art that what is depicted as a recorder 30 can be any data processing equipment such as a digital data acquisition and analysis system. For example, a computer can be used to record the two signals and be programmed to display the two signals on the CRT of the computer and/or give a readout of the vacuum value at which the packet face rises. Also, it can be a voltmeter system capable of recording the signals rapidly as a function of time.

Figure 4:
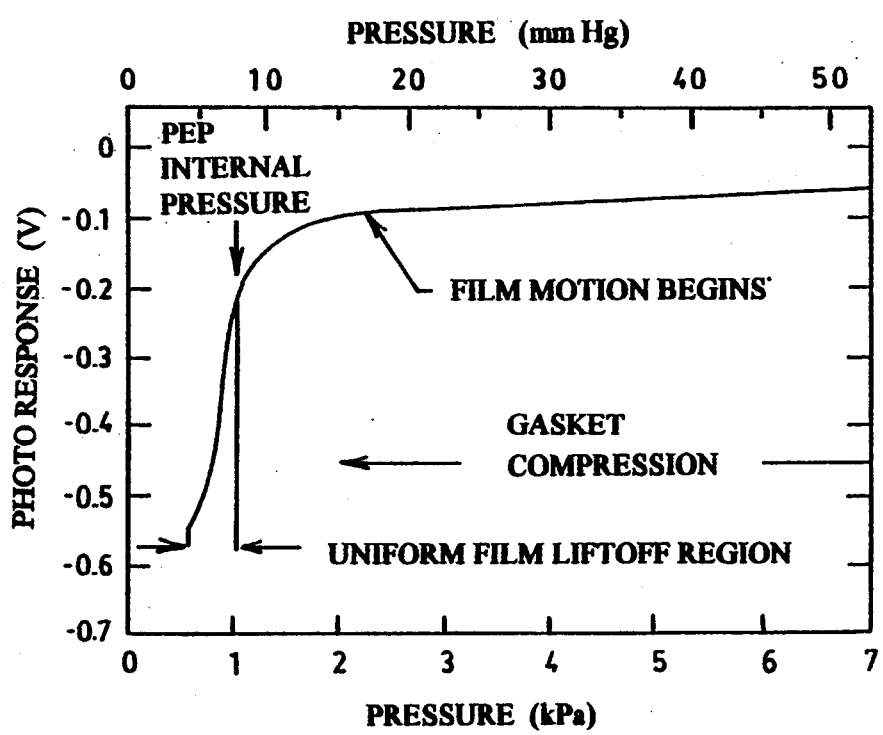
FIG. 4 is a plot of a typical X-Y recorder output during measurement of the internal pressure of a powder-filled evacuated panel (PEP) showing the typical relationship between photo response (related to displacement) and pressure.

In a normal operation of the embodiment of FIG. 1, the detector head 18 is placed tightly against the packet face 14. Light from the light source 24 is directed down through light pipe portion 20A so as to impinge upon the face 14, and to be retro-reflected upwardly through light pipe portion 20B to the photo detector 26 providing an initial signal on lead 28. Vacuum is gradually applied to the face 14 via the vacuum line 22, with this vacuum eventually slightly exceeding the vacuum inside the packet 12. This causes the wall 14 of the packet 12 to lift a few thousandths of an inch (e.g., one to ten thousandths). As this lifting occurs, the intensity of the retro-reflected portion of the impinging light is modulated until it changes abruptly and therefore the signal of the photo detector 26 on lead 28 changes accordingly. At the same time, the signal on lead 40 is decreasing as the vacuum is increased, as measured by the detector 38. These two signals then depict the actual vacuum, with a plot 42 of the two signals being available on the measuring device 30, if desired. (FIG. 4 is such a plot of actual data.) As indicated, there is a sharp break in the plotted data at the point of lift to provide a measurement of the vacuum within the packet 12.

There are some types of materials that are packed in some types of film packets that can deform upwardly as the vacuum is applied through the head 18 even if the applied vacuum does not exceed the internal value. This is particularly true for rheological materials, such as powders, gases and liquids in thin packets, and results in an inverted "dimple" on the lower face 16. Such deformation can give rise to some error in internal packet vacuum determination.

Figure 2:
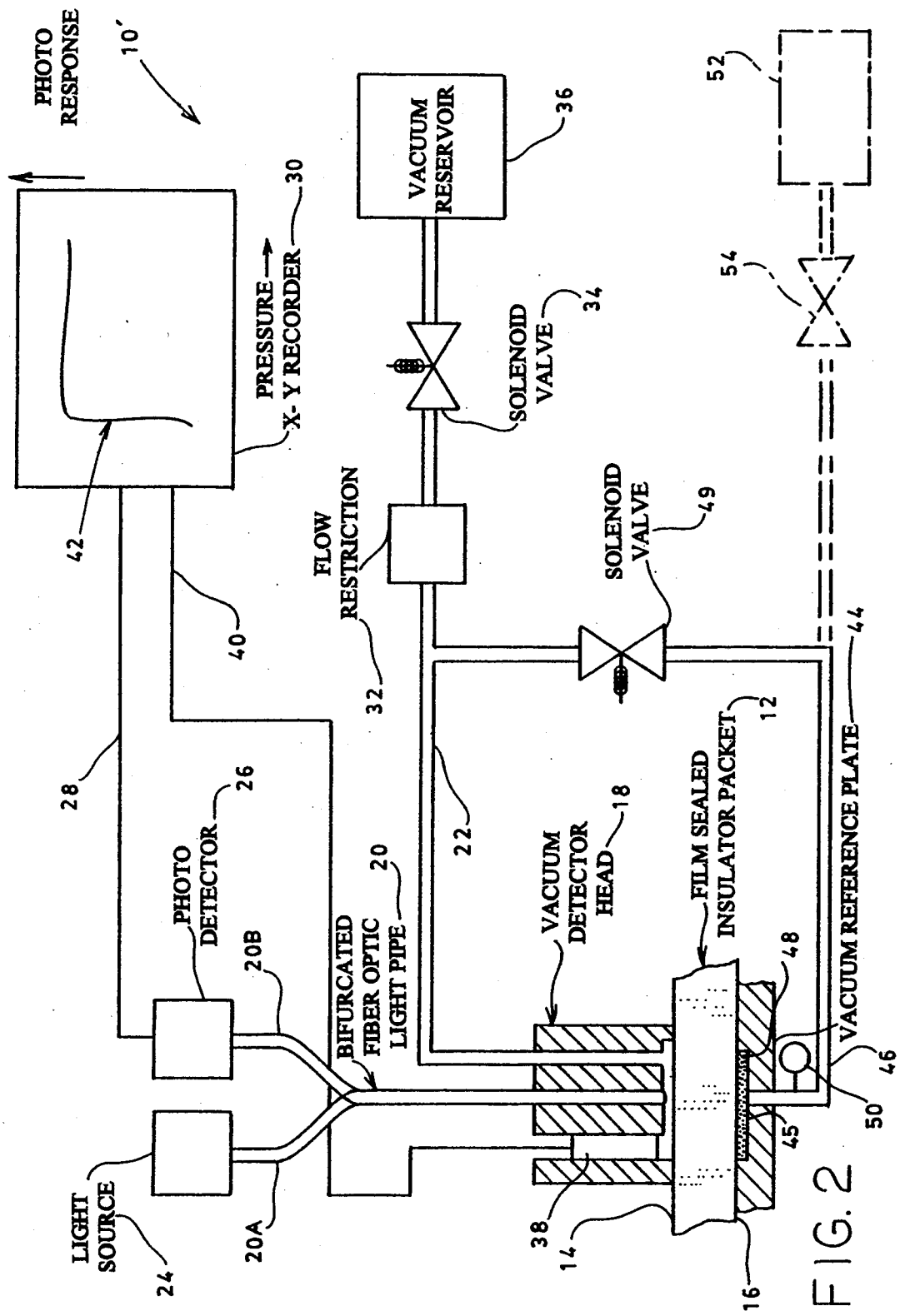
FIG. 2 is a schematic drawing of another embodiment of the present invention as used for the measurement of vacuum within sealed plastic film packets containing rheological materials, such as powders, gases or liquids.

In order to overcome this "transfer" of face motion, another embodiment of the present invention is shown generally at 10' in FIG. 2. Essentially all components of this embodiment 10' are the same as the embodiment 10 of FIG. 1 and therefore they carry the same identifying numerals. In addition, there is a vacuum reference plate 44, that supports the packet in the same manner as support 17 of FIG. 1, having a central recess 45. This central recess 45 is the terminus of a vacuum line 46 that leads to the vacuum source (or reservoir) 36. Of course, a separate vacuum source 52 and valve 54 can be used, if desired. In order that the face 16 is not significantly distorted, a firm porous plastic layer can be applied over the opening to the central recess 45. Alternatively, the central recess can have a porous member 48 as illustrated (and discussed in the aforementioned patent application Ser. No. 07/826,799). In this embodiment, a second solenoid valve 49 can be included in the vacuum line 46 to permit connection to the vacuum source 36 via the restriction 32 and valve 34. Of course, other connection routes can be utilized for achieving a vacuum at the vacuum reference plate 44 independently or in combination with the application of a vacuum within the internal volume 19 of the detector head 18. Typically, a vacuum gauge 50 measures the static pressure in the cavity 45. This can be, for example, a capacitance-type manometer. This embodiment of FIG. 2 permits application of vacuum to the packet face 16 to prevent pre-mature lifting of face 14 due to deformation of the body of the packet when vacuum is applied to the upper face 14 by the vacuum head 18. Accordingly, the vacuum reading of detector 38 can be calibrated against that of vacuum gauge 50 during this time prior to deflection of upper face 14. Thereafter, the valve 49 can be closed to hold the vacuum against the face 16 if desired.

It will be understood by persons skilled in the light pipe art that light directed to and retro-reflected from a surface will change in intensity as a function of spacing between that surface and the distal end of the light pipe. When the face lifts, the output signal of the photo detector will change abruptly.

One of the objects of the present invention is to provide an instrument that can be used on a production line used for manufacturing sealed packets. An embodiment of the present invention is for such utilization is described, and claimed in the aforementioned patent application Ser. No. 07/826,799, which is incorporated herein by reference.

In either of these embodiments of FIGS. 1 and 2, the vacuum detector head 18 is typically cylindrical having a diameter of about two inches and a height of about two inches. It is typically fabricated from aluminum; however, any suitable durable material can be used. Although not shown, it may be desirable to include an annular gasket on the periphery of the vacuum detector head 18 if the item being checked is relatively rigid and perhaps not essentially flat. The vacuum line 22 is typically ¼ inch in diameter, and the passageway for the light pipe 20 is typically ¼ inch in diameter. Of course, other sizes and configurations are within the scope of the present invention.

The embodiments of the present invention have been depicted as using a bifurcated light pipe whereby impinging and reflected light are perpendicular to the surface of the packet. However, it will also be recognized that other forms of light pipes can be used wherein an end of one light pipe can be arranged with respect to the surface to illuminate that surface and another light pipe can be arranged at another angle such that the reflected light is modulated when distortion of the face occurs. Either of these arrangements can be used on flat or curved surfaces. Also, other sources of impinging light and light detection can be substituted for the light pipe units (either bifurcated or dual).

Figure 3:
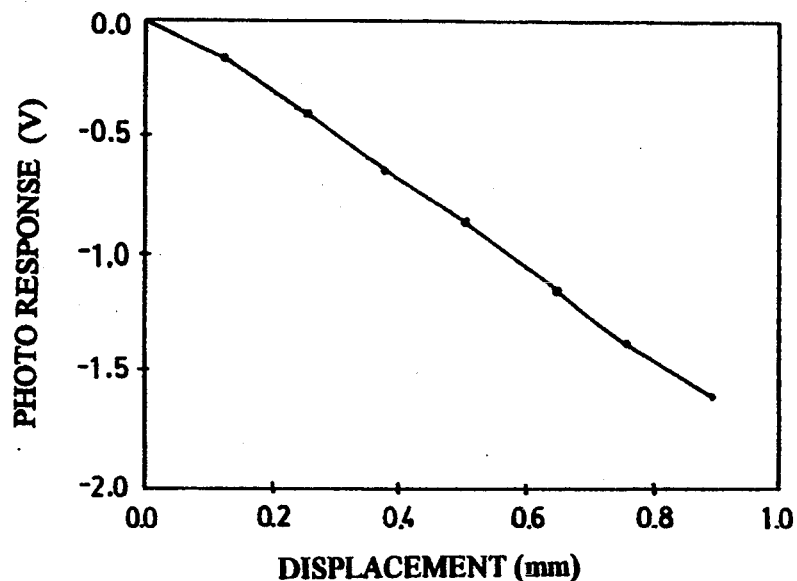
FIG. 3 is a plot of photo response as a function of displacement of a packet surface illustrating the essentially linear response as a function of displacement.

The photo response of the present invention has been investigated, and the results are depicted in FIGS. 3 and 4. In FIG. 3, for example, the photo response is plotted as a function of displacement. From this plot it can be seen that the response is nearly linear over the range tested. Then, in FIG. 4 is plotted the photo response as a function of pressure (as would be shown in the aforementioned X-Y recorder 30 shown in FIGS. 1 and 2. From these data it has been determined that as little as 0.1 mil (0.00254 mm) displacement can be determined. The uniform film liftoff region, over which there is a great difference in photo response, is only about 2.5 mm Hg wide.

From the foregoing, it will be understood that a simple and accurate instrument has been provided for the determination (measurement) of vacuum within a sealed packet. This instrument will serve to provide this information when the wall of the packet is sufficiently thin so as to be deformed by application of a vacuum against the surface thereof. It can be used for the random testing of individual packets, or can be used for the routine testing of packets on a production line. The desired vacuum information is readily obtained with an instrument of considerable simplicity and thus low cost.

It will be understood that the instrument will have applications other than determining lift-off of a film. There are applications where the porosity of objects must be determined. The application of a vacuum to one surface, with a monitoring of the rate of change in vacuum, can be transformed into information as to the porosity of the object being tested. Other related applications will be recognized by persons having knowledge of the present invention.

Although the present invention has been described for the specific application to plastic film encased packets, it will be understood that it is suitable for use with metal foil enclosed packets or packets fabricated of any other material that is relatively easily deformed by the application of a localized vacuum. It will be recognized that an entire wall of the packet need not be deformable as long as a portion thereof is deformable such that the detector head can be positioned adjacent thereto.

While certain specifics of construction are given, these are for illustration purpose and not for limiting the present invention. Rather, the invention is to be limited only by the appended claims and their equivalents.

We claim:

1. An instrument for the measurement of vacuum within a sealed packet, said packet having at least one deformable wall, said instrument comprising:
   a detector head for positioning against the deformable wall of the packet, said detector head defining an interior cavity having an open mouth to be placed against the deformable wall;
   a vacuum source connected to said interior cavity of said detector head to apply a controlled dynamic vacuum to the deformable wall;
   a light source in combination with a light pipe to direct a beam of light against the deformable wall;
   a light detector in combination with a second light pipe to receive light from said light source reflected from the deformable wall and to provide a signal related to said reflected light;
   a vacuum detector mounted in said detector head to monitor said controlled dynamic vacuum in said interior cavity of said detector head as said dynamic vacuum is applied to the deformable wall and provide a signal related to a value of said dynamic vacuum; and
   a circuit to relate said signals from said light detector and said vacuum detector to provide said measurement of vacuum within the packet when said dynamic vacuum initiates deformation of the deformable wall.

2. The instrument of claim 1 wherein said light pipe and said second light pipe comprise a bifurcated light pipe unit, said bifurcated light pipe unit having a distal end within said internal cavity of said detector head, and a proximal end divided into a first portion connected to said light source and a second portion connected to said detector of said reflected light, whereby said bifurcated light pipe unit directs light from said light source upon the deformable wall, and directs said reflected light to said light detector.

3. The instrument of claim 1 wherein said vacuum source comprises:
   a vacuum producing unit;
   a vacuum conduit connecting said vacuum producing unit to said detector head;
   a valve in said vacuum conduit for controlling said vacuum applied to said detector head;
   a flow restrictor in said vacuum conduit to prevent excessive rate of application of vacuum to said detector head; and wherein said vacuum detector for monitoring said controlled vacuum is a transducer to produce an electrical signal corresponding to said controlled vacuum within said internal cavity of said detector head.

4. The instrument of claim 1 wherein said circuit to relate said signals from said light detector and said vacuum detector to provide said measurement of vacuum within the packet is a digital data acquisition and analysis system which automatically and continuously correlates said signal from said light detector with said signal from said vacuum detector and detects an abrupt change in said signal from said light detector, and displays a value of said vacuum in the sealed packet.

5. The instrument of claim 1 wherein said circuit to relate said signals from said light detector and said vacuum detector to provide said measurement of said vacuum within the sealed packet is an X-Y recorder, with said signal from said light detector applied to a Y-axis of said recorder, and said signal from said vacuum detector applied to an X-axis of said recorder.

6. The instrument of claim 1 wherein the packet has a second deformable wall on an opposite side of the packet, said instrument further comprising:
   a plate for uniformly supporting the packet on the second deformable wall, said plate provided with a recess toward the second deformable wall; and
   a further vacuum conduit connected between said recess of said plate and said vacuum source for applying a vacuum to the second deformable wall of the packet.

7. The instrument of claim 6 further comprising a further valve in said further vacuum conduit whereby said recess can be isolated from said vacuum source.

8. An instrument for the measurement of vacuum within a sealed packet, the packet having at least one deformable wall, said instrument comprising:
   a detector head for positioning against the deformable wall of the packet, said detector head defining an interior cavity having an open mouth to be placed against the deformable wall;
   a vacuum source connected to said interior cavity of said detector head with a vacuum conduit to apply a controlled dynamic vacuum to the deformable wall;
   a bifurcated light pipe, said bifurcated light pipe having a proximal end having first and second portions, and a distal end positioned within said interior cavity of said detector head near the deformable wall;
   a light source connected to said first portion of said proximal end of said light pipe to introduce light into said light pipe to direct a beam of light against the deformable wall;
   a light detector connected to said second portion of said proximal end of said light pipe to receive light reflected from the deformable wall and to provide a signal related to said reflected light;
   a vacuum detector mounted in said detector head at said interior cavity to monitor said controlled dynamic vacuum in said interior cavity of said detector head as said controlled dynamic vacuum is applied to the deformable wall and to provide a signal related to a value of said vacuum; and
   a circuit to relate said signals from said light detector and said vacuum detector to provide said measurement of vacuum within the packet when said controlled dynamic vacuum initiates deformation of the deformable wall.

9. The instrument of claim 8, further comprising:
   a valve in said vacuum conduit for controlling said dynamic vacuum applied to said interior cavity of said detector head; and
   a flow restrictor in said vacuum conduit to prevent excessive rate of application of dynamic vacuum to said detector head.

* * * * *